United States Patent
Gruenewald et al.

(10) Patent No.: US 12,461,510 B2
(45) Date of Patent: Nov. 4, 2025

(54) UNIVERSAL DATA ACCESS ACROSS DEVICES

(71) Applicant: Siemens Aktiengesellschaft, Munich (DE)

(72) Inventors: Thomas Gruenewald, Somerset, NJ (US); George Lo, Langhorne, PA (US); Florian Ersch, Plainsboro, NJ (US); Hartmut Ludwig, West Windsor, NJ (US); Lingyun Wang, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 779 days.

(21) Appl. No.: 16/495,426

(22) PCT Filed: Mar. 22, 2017

(86) PCT No.: PCT/US2017/023565
§ 371 (c)(1),
(2) Date: Sep. 19, 2019

(87) PCT Pub. No.: WO2018/174867
PCT Pub. Date: Sep. 27, 2018

(65) Prior Publication Data
US 2020/0073371 A1  Mar. 5, 2020

(51) Int. Cl.
*G05B 19/418* (2006.01)
(52) U.S. Cl.
CPC .... *G05B 19/41865* (2013.01); *G05B 19/4185* (2013.01); *G05B 2219/31395* (2013.01)
(58) Field of Classification Search
CPC ... G05B 1/00; G05B 1/03; G05B 1/08; G05B 19/418; G05B 19/4183; G05B 19/4185; G05B 19/41875; G05B 2219/31395
See application file for complete search history.

(56) References Cited

U.S. PATENT DOCUMENTS 4,304,001 A * 12/1981 Cope ............... H04B 17/40
340/870.37
5,828,851 A * 10/1998 Nixon ............. G05B 19/0421
713/1
(Continued)

FOREIGN PATENT DOCUMENTS

CN  103946806 A  7/2014
CN  104866528 A  8/2015
(Continued)

OTHER PUBLICATIONS

Wang et al., "An ObjectOriented Reconfigurable Software", in book: Modern Industrial Automation Software Design, IEEE, 2006, pp. 93-149. (Year: 2006).*
(Continued)

*Primary Examiner* — Rutao Wu
*Assistant Examiner* — Sarjit S Bains

(57) ABSTRACT

A system for providing access to locally stored process image data to other devices in an industrial production environment includes a plurality of controller devices and a process image backbone. Each respective controller device comprises the following: a volatile computer-readable storage medium comprising a process image area; a non-volatile computer-readable storage medium; a control program configured to provide operating instructions to a production unit; an input/output component configured to update the process image area during each scan cycle or upon the occurrence of one or more events with process image data items associated with the production unit; and a historian component configured to locally store the process image data items of the process image area as time series data in the non-volatile computer-readable storage medium. The process image backbone provides the plurality of controllers
(Continued)

with uniform access to the process image data items of each programmable logic device.

18 Claims, 4 Drawing Sheets

(56) References Cited

U.S. PATENT DOCUMENTS

| | | | | |
|---|---|---|---|---|
| 5,862,052 | A * | 1/1999 | Nixon | G06F 11/3048 713/1 |
| 6,032,208 | A * | 2/2000 | Nixon | G05B 19/4185 710/64 |
| 6,421,570 | B1 * | 7/2002 | McLaughlin | G05B 19/4185 709/201 |
| 6,868,538 | B1 * | 3/2005 | Nixon | G06F 8/34 700/83 |
| 6,970,758 | B1 * | 11/2005 | Shi | G05B 15/02 700/121 |
| 8,078,357 | B1 * | 12/2011 | Trytten | G06F 8/20 700/95 |
| 9,235,719 | B2 | 1/2016 | Neve De Mevergnies et al. | |
| 2006/0259154 | A1 | 11/2006 | Hood et al. | |
| 2006/0259160 | A1 | 11/2006 | Hood et al. | |
| 2008/0082195 | A1 * | 4/2008 | Samardzija | G05B 23/024 700/109 |
| 2009/0083204 | A1 * | 3/2009 | Baier | G06F 11/3013 706/45 |
| 2009/0089231 | A1 * | 4/2009 | Baier | G05B 19/41875 706/45 |
| 2009/0089359 | A1 * | 4/2009 | Siorek | G05B 19/4186 709/201 |
| 2012/0054650 | A1 * | 3/2012 | Bliss | G06F 3/04847 715/764 |
| 2013/0211546 | A1 | 8/2013 | Lawson et al. | |
| 2014/0277604 | A1 * | 9/2014 | Nixon | G05B 19/4185 700/47 |
| 2014/0277656 | A1 * | 9/2014 | Nixon | G05B 19/4185 700/95 |
| 2014/0282227 | A1 * | 9/2014 | Nixon | G06F 8/34 715/786 |
| 2014/0297002 | A1 * | 10/2014 | Ji | G05B 13/048 700/30 |
| 2015/0277404 | A1 * | 10/2015 | Maturana | G05B 15/02 700/83 |
| 2015/0278721 | A1 * | 10/2015 | Oku | G06Q 10/063 705/7.11 |
| 2016/0054720 | A1 * | 2/2016 | Lo | G05B 19/054 700/87 |
| 2016/0098037 | A1 * | 4/2016 | Zornio | H04L 43/045 700/20 |
| 2016/0216706 | A1 * | 7/2016 | Christensen | G05B 19/41865 |
| 2016/0224001 | A1 * | 8/2016 | Bruck | G05B 19/05 |
| 2017/0102678 | A1 * | 4/2017 | Nixon | G05B 17/02 |
| 2017/0102694 | A1 * | 4/2017 | Enver | G05B 19/41875 |
| 2017/0103103 | A1 * | 4/2017 | Nixon | G06F 16/2452 |
| 2018/0259929 | A1 * | 9/2018 | Eguchi | G05B 19/05 |

FOREIGN PATENT DOCUMENTS

| | | |
|---|---|---|
| JP | 2014238820 A | 12/2014 |
| JP | 2018151726 A | 9/2018 |

OTHER PUBLICATIONS

International Search Report dated Nov. 16, 2017; International Application No. PCT/US2017/023565; Filing Date: Mar. 22, 2017; 12 pages.

* cited by examiner

UNIVERSAL DATA ACCESS ACROSS DEVICES

This application is a national phase filing under 35 U.S.C. § 371 of International Patent Application No. PCT/US2017/023565, filed Mar. 22, 2017, which is incorporated herein by reference in its entirety.

TECHNICAL FIELD

The present disclosure relates generally to providing universal access to process image data across a plurality of automation devices using a process image backbone. The various systems and methods may be applied to industrial automation applications, as well as various other applications where controllers are used.

BACKGROUND

A controller is a specialized computer control system configured to execute software which continuously gathers data on the state of input devices to control the state of output devices. Examples of controllers include programmable logic controllers, motion controllers, CNC, Smart I/O and drive controllers. A controller typically includes three major components: a processor (which may include volatile memory), volatile memory comprising an application program, and one or more input/output (I/O) ports for connecting to other devices in the automation system. Modern controllers have their own process images and data historians. Additionally, these systems often have proprietary data access interfaces to facilitate cross layer (vertical) data access between automation systems.

It is important to get data access all automation systems vertically and horizontally for data management and data analytics tasks, as wells as control tasks that allow machines to collaborate to solve one task. However, conventional automation systems follow a pyramid structure, which calls for the transfer of all raw data (millions of sample points) from controllers to the historian at an upper layer (e.g., SCADA or IVIES level). Pushing of data into the upper level reduces the resolution and readiness of data which, in turn, limits the effectiveness of analytics for extracting insights from the controller behavior and increases the latency to intervene in the control process for control optimization. The ability of controllers to support in depth data analytics based on their privileged access to process data and controller logic is underutilized in conventional systems. The latter is due to static controller logic/configuration, which does not currently support dynamic adaptive changes or post commissioning phase changes of the control logic, and also does not support awareness of other controller's data and context when this is required.

Additionally, different data adapters are often needed to extract information out of each device connected to the automation system. There is no relatively transparent mechanism which provides data access ace across automation devices and layers for data management and data analytics tasks. Moreover, some automation systems do not even provide such access, and require parsing of output files to extract relevant data.

SUMMARY

Embodiments of the present invention address and overcome one or more of the above shortcomings and drawbacks, by providing methods, systems, and apparatuses related to universal data access across automation devices using a process image backbone. The process image backbone unifies data access from different devices or different runtimes and serves as a medium for decoupled interactions between the different runtimes. The technology described herein is particularly well-suited for, but not limited to, various industrial automation applications.

According to some embodiments, a system for providing access to locally stored process image data to other devices in an industrial production environment includes a plurality of controller devices and a process image backbone. Each respective controller device comprises the following: a volatile computer-readable storage medium comprising a process image area; a non-volatile computer-readable storage medium; a control program configured to provide operating instructions to a production unit; an input/output component configured to update the process image area during each scan cycle or upon the occurrence of one or more events with process image data items associated with the production unit; and a historian component configured to locally store the process image data items of the process image area as time series data in the non-volatile computer-readable storage medium. The process image backbone provides the plurality of controllers with uniform access to the process image data items of each programmable logic device. In some embodiments, the control program of the controller is further configured to (i) use the process image backbone to retrieve one or more process image data items from a second controller and (ii) use the retrieved one or more process image data items to generate the operating instructions for the production unit.

Various techniques may be used for implementing the process image backbone in the aforementioned system. For example, in some embodiments, the backbone comprises a plurality of process image backbone instances, with each process image backbone instance located on one of the controller devices. Each instance may include, for example, a data registry comprising one or more objects semantically describing the process image data items stored on the controller. Each controller may transmit its data registry to other controllers periodically, for example, at startup of the controller, upon cyclic updates of the controller, or upon modification of the data registry. Alternatively (or additionally), the data registry can be transmitted in response to request to browse one or more data tags within the registry. Transmission between controllers can take place, for example, using a multicast message or a broadcast message.

In some embodiments of the aforementioned system, the process image backbone instance located on each controller includes a messaging component implementing a publish-subscribe messaging pattern for transmitting process image data items between the plurality of controllers. This messaging component may include one or more queues for publishing process image data items for receipt by subscribing controllers, wherein each queue is associated with a particular process image data item or a particular type of process image data item.

According to another aspect of the present invention, a method for providing access to local process image data to other devices in an industrial production environment includes a controller executing a control program configured to provide operating instructions to a production unit over a plurality of scan cycles and updating a process image area during each of the scan cycles with data associated with the production unit. The controller stores the process image data items into a local non-volatile computer readable medium on the first controller and uses a process image backbone instance to provide one or more second controller with access to the stored process image data items. The method may further include the controller using the process image backbone instance to retrieve one or more process image data items from a second controller, and then using the retrieved one or more process image data items to generate the operating instructions for the production unit.

In some embodiments of the aforementioned method, the process image backbone instance located on the first controller includes a data registry comprising one or more data tags describing the process image data items stored on the controller. Techniques similar to those discussed above with respect to the system for providing access to locally stored process image data may be employed to transmit the data registry between each controller.

According to other embodiments, a method for accessing a local process image data stored on devices in an industrial production environment includes a computing device receiving a data registry comprising one or more objects semantically describing process image data items stored on a controller in the industrial production environment and generating a request for a process image data item using the data registry. The computing device transmits the request to the controller via a network connecting the controller and the computing device; and receives the process image data item from the controller via the network in response to the request.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to providing universal access to process image data across a plurality of automation devices using a process image backbone. The process image backbone is a form of middleware, essentially "gluing" together the runtime environments of the different controllers and other field devices in the automation environment. Using the process image backbone, the various devices conceptually share one large process image. Thus, a device can interact with a remote device's process image data in essentially the same manner as the device's local process image data. As described in further detail below, various technologies may be used to support the transparency and connectivity provided by the process image backbone. For example, data is tagged using identifiers which provide a patent to the data source. An analogy can be made to a computer system where a local file may be addressed in some implementations using "C:/file.txt" and a remote file may be addressed using "/REMOTE COMPUTER/C/file.txt." By tagging all process image data, control programs can be written which are agnostic as to the location of process image data. To support communications between the different devices storing the data, robust networks are used in conjunction with messaging technologies such as publish/subscribe-based methods. Thus, not only can data be directly referenced by programs, it can also be delivered to meet execution requirements of the control program.

Figure 1:
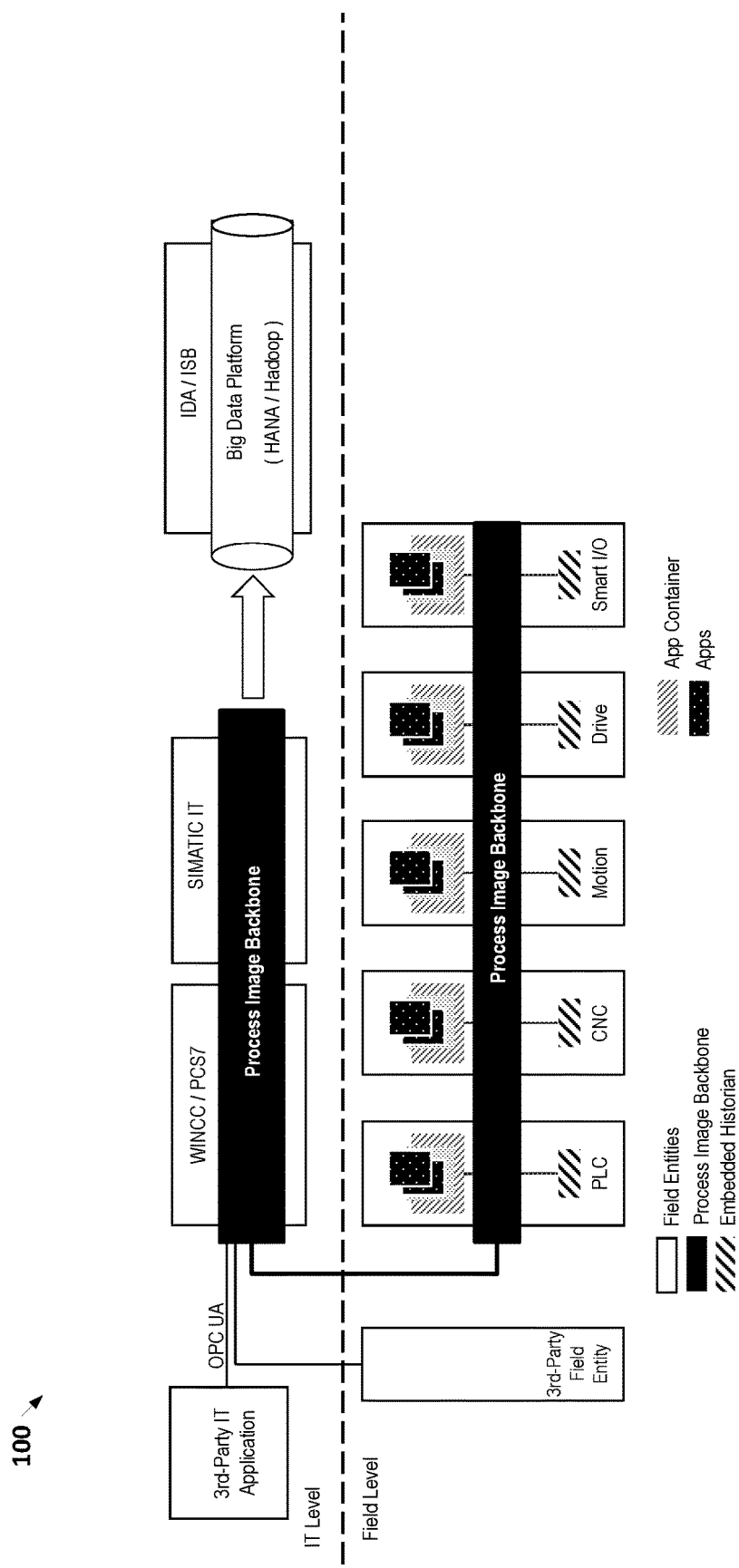
FIG. 1 provides an architecture diagram illustrating an industrial automation system where field entities and other automation devices are connected by a process image backbone FIG. 2 provides a conceptual view of a controller, according to some embodiments.

FIG. 1 provides an architecture diagram illustrating an industrial automation system 100 where field entities and other automation devices are connected by a process image backbone. The Process Image Backbone (PIB) unifies the data access from different devices or different runtimes and serves as the medium for decoupled interactions between the different runtimes, hence the term "backbone." The PIB supplements the capabilities available via systems such as OPC Unified Architecture (OPC UA). For example, in OPC UA you still need configuration; with the PIB the data is just available and semantically described so it can be used.

In the PIB, a process image or data historian is integrated into the common process image instead of into the local process image of the individual runtime. A PIB provides interfaces to browse all data tags and time series data in a system on all nodes of industrial automation system 100. Each application has to access the local access point of the process image backbone. The PIB is responsible for mapping to a local process image or historian or a remote process image or historian.

In the example of FIG. 1, seven field entities are shown including a controller, a CNC device, a Motion Controller, a Drive Controller, and a Smart I/O device. Each field entity includes one or more software applications (or "apps") executing in an app container. It should be noted that the use of apps in this case is entirely optional for implementation of universal data access via the PIB. Thus, an architecture similar to FIG. 1 can be implemented with more traditional controllers that do not offer app functionality.

Continuing with reference to FIG. 1, each field entity also includes an embedded historian which stores data generated in the app environment and a process image (not shown in FIG. 1) which stores inputs, outputs, etc. of the apps as they are executed. The process image backbone is effectively a common process image that serves as the medium for decoupled interactions between the different runtimes of the field entities. Structurally, each field entity maintains its local process image locally along with an instance of software for communicating in real-time or near-real time with other field entities. In some embodiments, the data accessible over the process image backbone is limited to the data present in the process image of each device at any given time. However, in other embodiments, the process image backbone can also be used to access the embedded historian of each device. Thus, windows of time series data can be accessed via the process image backbone.

Continuing with the example of FIG. 1, the process image backbone is implemented across devices IT level devices such as a supervisory control and data acquisition (SCADA) and human-machine interface (HMI) systems (e.g., WINCC/PCS7 and SIMATIC IT in FIG. 1). By connecting with these IT level devices, $3^{rd}$ party field entities can indirectly access the process image backbone. Thus, for example, existing field entities do not necessarily require significant changes to their control programs or architecture to support process image backbone access; rather, the existing field entities can just receive this data in the manner that other IT level data is received. Implementation of the process image backbone at the IT level also allows $3^{rd}$-Party IT Applications to access process image backbone data. Thus, in some embodiments, desktop or mobile apps can be created to access the backbone and view windows of process image data. These apps can communicate with the IT level devices using protocols such as TCP, Open Database Connectivity (ODBC), and/or OPC Unified Architecture (UA), using a local intranet (e.g., implemented via Ethernet) and/or one or more internets.

The system shown in FIG. 1 also provides accessibility of the process image backbone at the IT level which, in turn, facilitates processing of process image data by big data platforms such as HANA/Hadoop. This may be used, for example, to perform analytics on automation system operations in a parallel computing environment (e.g., NVIDIA CUDA©) using processing resources not available at the field level.

Figure 2:
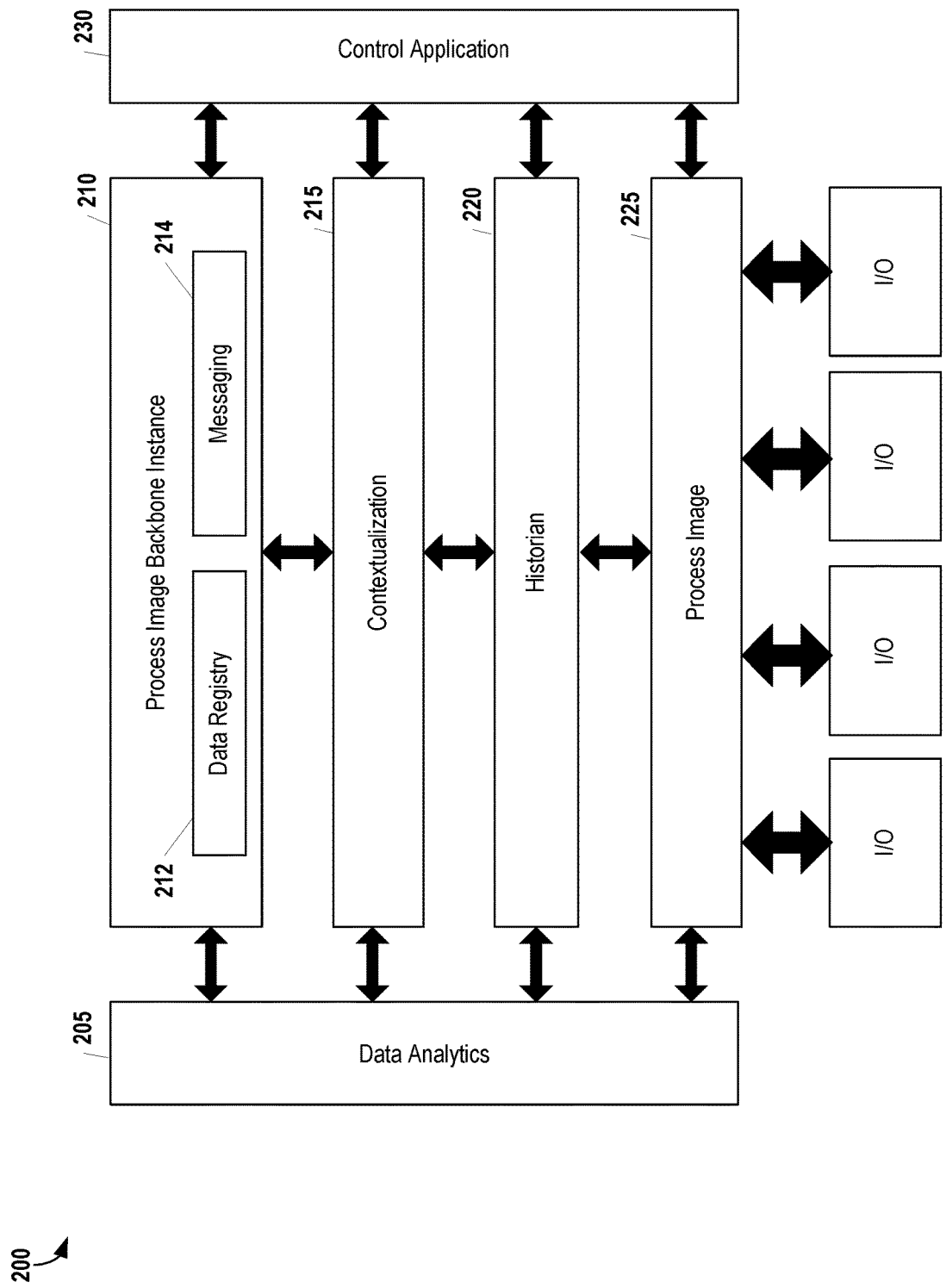

FIG. 2 provides a conceptual view of a Controller 200, according to some embodiments. Process Image 225 is a memory area in a controller's CPU volatile system memory which is updated in each processing/scan cycle based on data associated with the production devices (e.g., the inputs and outputs of connected I/Os). In each processing step, the Control Application 230 reads the Process Image Component 225, executes deployed application logic, and writes results back into the Process Image Component 225.

Continuing with reference to FIG. 2, the process image of each cycle is read and permanently stored locally on a non-volatile physical storage medium by the Historian Component 220. In addition, the Historian Component 220 may additionally store contextual information related to the process image data (described below with respect to the Contextualization Component 215). The Historian Component 220 may be configured to deploy data compression algorithms to reduce data volume and provide applications with access to past process images. Data may be stored either for a fixed time window or online algorithms are used to realize dynamic caching heuristics. As part of the Historian Component 220, intelligent data generation algorithms may continuously analyze the process image and context to adjust data generation parameters (e.g. sampling rate) of connected I/Os. For example, for fast changing sensor signals, a high sampling rate may be selected while for slowly changing sensor signals a lower sampling rate is sufficient.

A Data Analytics Component 205 is configured to execute one or more reasoning algorithms for analyzing data stored both locally and remotely across the process image backbone. Various data reasoning algorithms may be included in the Data Analytics Component 205. For example, in some embodiments, these algorithms include one or more of clustering, classification, logic-based reasoning, and statistical analysis algorithms. Moreover, algorithms may be specified via a model which can be deployed during runtime on the device. The Data Analytics Component 205 may also include various analytical models and dedicated algorithms to interpret these models. The results generated by the Data Analytics Component 205 may be stored in the Historian Component 220, written back to the Process Image Component 225 and/or provided to external components via the PIB Instance 210. Thus, the Controller 200 may be viewed as a device for providing distributed analytics to the other devices in the automation system.

A Contextualization Component 215 is configured to generate contextualized data by annotating contents of the Process Image Component 225 with automation system context information to facilitate its later interpretation. Context information, as used herein, may include any information that describes the meaning of data. For example, context of data in automation systems may include information about the device that generated the data (e.g., a sensor), about the structure of the automation system (e.g., topology of a plant), about the working mode of the system (e.g., downtime event), about the automation software and its status while the data was generated, and/or about the product/batch that was produced while the data was generated. The Contextualization Component 215 is configured to provide data to any of the other components for more specific processing needs. The context information generated by the Contextualization Component 215 may not be restricted to the asset structure but may also include control knowledge, product-specific information, process information, event information, and potentially other aspects such as external events like weather information. Some context information may be imported from engineering tools (e.g. Siemens Totally Integrated Automation tools). Additionally, in some embodiments, the Contextualization Component 215 provides semantic contextualization. The context may be represented by a standard modeling language (e.g. Web Ontology Language, Resource Description Framework) where the meaning of the language constructs is formally defined. Contextualization of data with these semantic modeling standards enables business analytics applications to automatically understand and interpret the data provided from the automation system without manual configuration effort.

Any data captured or generated by the components of Controller 200 may be provided to external components via a PIB Instance 210 which connects the Controller 200 to other devices in the automation system via the process image backbone discussed herein. As shown in FIG. 1, the PIB Instance 210 comprises a Data Registry 212 and a Messaging Component 214. The Data Registry 212 provides a list of process image data available in the controller. This data is either stored in the Historian 220 or the Process Image 225 itself. In some embodiments, the Data Registry 212 is one or more data files stored locally on the controller using a format such as Extensible Markup Language (XML). The Controller 200 can respond to tag browser requests from other devices in the automation system by providing the Data Registry 212, file or a portion thereof. For example, if a device only requests a certain portion of the Data Registry 212 the file may be parsed and an appropriate subset of the overall file can be returned. The contents of the Data Registry 212 can be populated prior to runtime or at runtime. For example, the contents of the file can be populated when the Controller 200 is first booted and initialized. Alternatively, the file can be updated every scan cycle or over some other interval. In some embodiments, rather than storing a file, the Data Registry 212 is dynamically generated upon request. Thus, in these embodiments, the Data Registry 212 comprises one or more processes which quickly scan the runtime environment of the controller to populate a data file which can then be used to respond to the request.

The Messaging Component 214 in the PIB Instance 210 provides a way to communicate the registry and other data over the process image backbone connecting automation system devices. The exact implementation of the Messaging Component 214 can vary, depending on the availability of networking technologies and the needs of the system. For example, in some embodiments, the Messaging Component 214 implements one or more transport layer protocols generally known in the art such as TCP, UDP, DCCP, SCTP, and/or RSVP. The Messaging Component 214 includes functionality that allows the transport protocol to be selected based on real-time requirements or a guaranteed quality of service. For example, for near-real time communications UDP may be used by default, while TCP is used for communications which have more lax timing requirements but require additional reliability. The Messaging Component 214 also includes functionality for leveraging the implemented transport layer protocols to perform broadcast or multicast communications. Thus, for example, the Messaging Component 214 would also be the Controller 200 to broadcast a unique identifier to other devices in the automation system.

In some embodiments, the Messaging Component 214 also implements publish/subscribe messaging. As is generally understood in the art, a publish-subscribe messaging scheme is one in which senders of messages, or "publishers", characterize messages into classes or types. As data is generated, messages are placed in class-specific or type specific queues. Devices "subscribe" to the data that is available in the queues. Thus, the Messaging Component 214 can be visualized as comprising a plurality of queues, each queue being associated with one or more subscriber. After a publisher enters data into a queue, the data in transmitted to each subscriber of the queue. In some embodiments, the Messaging Component 214 provides context-based publish-subscribe functionality. For example, other devices can subscribe to a particular data tag. The data related to that tag is placed in a queue which, in turn, is used to generate messages to one or more subscribing devices. Alternatively or additionally, the Messaging Component 214 may implement topic-based queues. For example, the Controller 200 may publish all alarms generated by the Control Application 230 into a particular queue for transmission to certain subscribers.

In some embodiments, the Messaging Component 214 may allow the Controller 200 to operate in a more traditional client-server messaging scheme. Thus, devices in the automation system can send HTTP GET requests to the Controller 200 which are handled by the Messaging Component 214. The Messaging Component 214 may use a web service technology such as representational state transfer (REST) to facilitate access to controller resources using a set of pre-defined stateless operations. Although the process image backbone is generally designed to provide read-only access to the controller data, in embodiments where write access is also granted, the Messaging Component 214 may include additional functionality for supporting HTTP commands such as POST, PUT, DELETE, etc.

Notably, the various components of the Controller 200 are connected to the PIB Instance 210 shown in FIG. 2. This allows data from other controllers, or other devices in the automation environment to be leveraged directly during operations. For example, the Contextualization Component 215 can contextualize data from the Process Image 225 using data acquired from other devices via the process image backbone. Similarly, the Control Application 230 can be coded in a manner that allows externally generated data to be integrated in the logic. For example, the Control Application 230 can include logic that retrieves data from a second controller (e.g., via a GET request). This data can then be used in the Control Application 230 to perform operations just as if the data was generated locally. For example, a conditional operation within the Control Application 230 may depend on data from a second controller in the automation system.

Additional examples of controller features that may be used in conjunction with different embodiments of the controller shown in FIG. 2 are provided in U.S. patent application Ser. No. 14/467,125 filed Aug. 25, 2014 and entitled "PROGRAMMABLE LOGIC CONTROLLER"; PCT Patent Application No. PCT/US14/63105 filed Oct. 30, 2014 and entitled "USING SOFT-SENSORS IN A PROGRAMMABLE LOGIC CONTROLLER"; PCT Patent Application No. PCT/US14/62796 filed Oct. 29, 2014 and entitled "SYSTEM AND METHOD FOR AUTOMATIC COMPRESSION ALGORITHM SELECTION AND PARAMETER TUNING BASED ON CONTROL KNOWLEDGE." The entirety of each of the foregoing applications is incorporated herein by reference.

Figure 3:
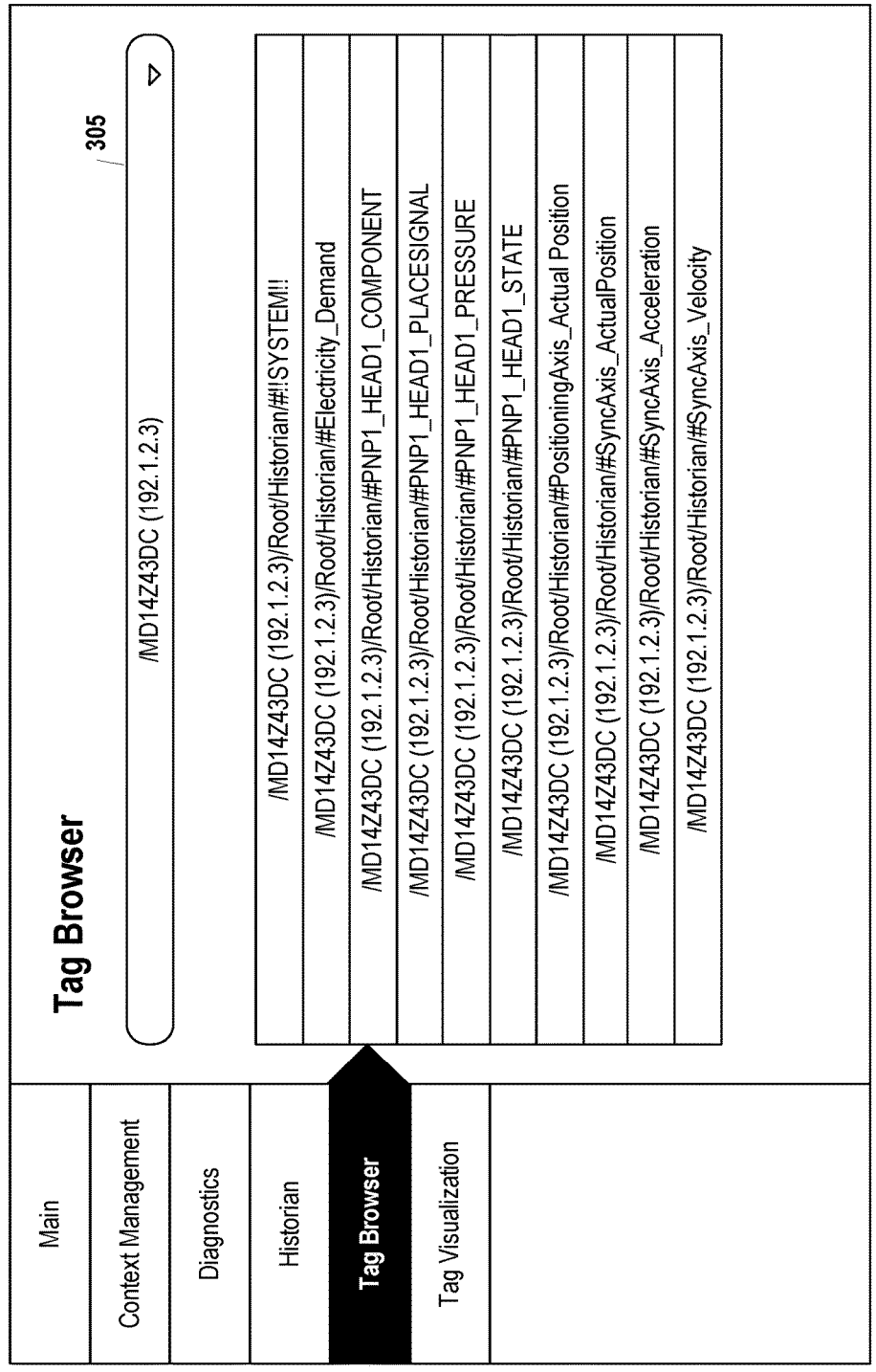
FIG. 3 provides an example of a tag browser GUI which can be used in some embodiments to display process image registry data FIG. 4A provides an example of how devices connected to the process image backbone can become aware of the functionality of their neighbor using multicast or broadcast of a process image registry.

FIG. 3 provides an example of a tag browser GUI 300 which can be used in some embodiments to display process image registry data. The tag browser can be included in a broader range of tools included in the GUI. For example, in FIG. 3, addition functionality such as Context Management, Diagnostics, Historian access is available in the tag browser GUI 300 along with tag-specific functionality. A dropdown list 305 allows a user to select a particular automation device. In this example, the tag browser GUI 300 is set to automation device MD14Z43DC located at address 192.1.2.3. Based on the selection of the dropdown list 305, the various registry items are listed in section 310. Here the registry items are data variables available on automation device MD14Z43DC. For example, "/MD14Z43DC (192.1.2.3)/Root/Historian/#Electricity_Demand" is used to denote a variable called "Electricity Demand" stored within the historian of MD14Z43DC. Note that the full path information is provided for each registry item. This path information can be used in forming requests for data items. Thus, a controller can send controller MD14Z43DC a request to subscribe to all data updates from "/MD14Z43DC (192.1.2.3)/Root/Historian/#Electricity_Demand." Then, as new electricity demand data is generated, it can be delivered automatically to the subscribing controller.

Figure 4A:
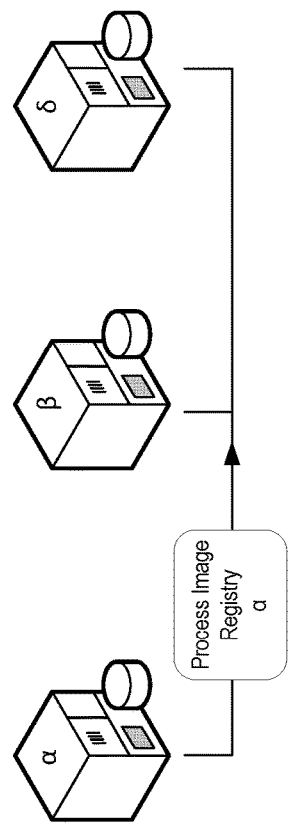
FIG. 4B provides an example of how devices connected to the process image backbone can become aware of the functionality of their neighbor using multicast or broadcast of a device identifier.
FIG. 4C provides an example of how devices connected to the process image backbone can become aware of the functionality of their neighbor by storing a process image registry on a gateway server.
Figure 4B:
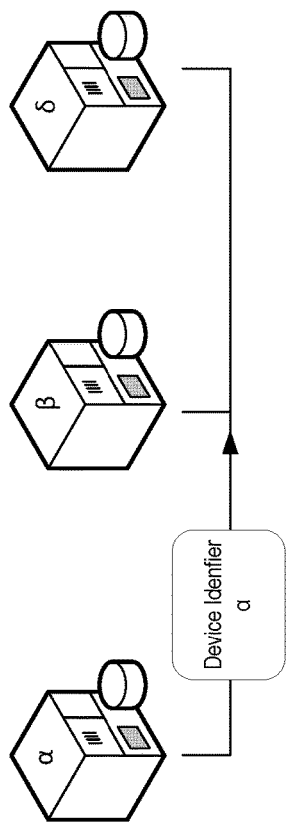
Figure 4C:
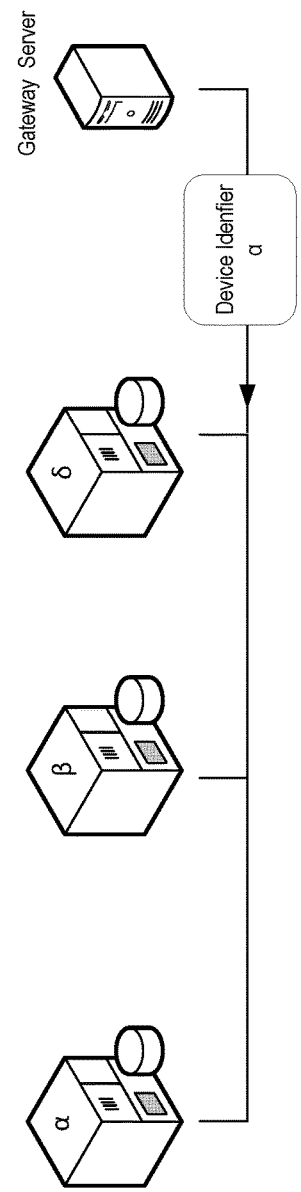

FIGS. 4A-4C provide some examples of how devices connected to the process image backbone can become aware of the functionality of their neighbor. These examples illustrate how connectivity to the process image backbone can be implemented in a "plug and play" manner. These examples each include three controllers (labeled α, β, and δ) connected via the process image backbone. Assume the controller α has recently been added to the process image backbone or a configuration change has been made to controller α (e.g., an update to the control application has been installed). In FIG. 4A, controller α multicasts or broadcasts its new process image registry to controllers β, and δ. Then the process image registry is stored locally by controllers β, and δ and can be used to request data stored on controller α. FIG. 4B is similar to FIG. 4A; however, rather than distribute the entire registry, controller α only distributes an address or other unique identifier that allows controllers β, and δ to access its data. As with FIG. 4A, controllers β, and δ store the unique identifier locally on their respective storage systems. FIG. 4C includes a gateway server or other computing device that stores process image registries and/or the unique identifiers for all devices connected to the process image backbone. Thus, in this example, the server would store the process image registry for controllers α, β, and δ. If a controller wants to access data from another machine on the backbone, it can request a list of connected machines and/or their respective registries.

The processors described herein as used by embedded controllers may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation to the embedded controllers and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A system for providing access to locally stored process image data to other devices in an industrial production environment, the system comprising:
   a plurality of controller devices, wherein each respective controller device comprises:
      a volatile computer-readable storage medium comprising a process image area;
      a non-volatile computer-readable storage medium;
      a control program configured to provide operating instructions to a production unit;
      an input/output component configured to update the process image area during each scan cycle or upon the occurrence of one or more events with process image data items associated with the production unit;
      a historian component configured to locally store the process image data items of the process image area as time series data in the non-volatile computer-readable storage medium; and
   a process image backbone providing the plurality of controller devices with uniform access to the process image data items of each controller device, the process image backbone configured as a middleware gluing together runtime environments of the plurality of controller devices, such that the process image areas or the historian components of the plurality of controller devices are integrated into a common process image, wherein the process image backbone comprises a plurality of process image backbone instances, each process image backbone instance located on one of the plurality of controller devices, wherein the process image backbone instance located on each controller device includes a data registry comprising one or more objects semantically describing the process image data items stored on the controller device, the data registry providing a list of process image data items available in the controller device, and a messaging component for communicating data from the data registry over the process image backbone, and wherein the control program of a first controller device is configured to use the process image backbone to retrieve one or more process image data items from a second controller device and use the retrieved one or more process image data items to generate the operating instructions for the production unit.

2. The system of claim 1, wherein the data registry comprises a data file periodically transmitted to each of the other controller devices.

3. The system of claim 1, wherein the data registry comprises a data file dynamically generated in response to a tag browsing request.

4. The system of claim 1, wherein the process image backbone instance is configured to provide the data registry to each of the other controller devices using a multicast message or a broadcast message.

5. The system of claim 4, wherein the multicast message or the broadcast message is transmitted upon startup of the controller device.

6. The system of claim 4, wherein the multicast message or the broadcast message is transmitted upon cyclic updates of the controller device.

7. The system of claim 4, wherein the multicast message or the broadcast message is transmitted upon modification of the data registry by the controller device.

8. The system of claim 1, wherein the messaging component is configured to implement a publish-subscribe messaging pattern for transmitting process image data items between the plurality of controller devices.

9. The system of claim 8, wherein the messaging component comprises one or more queues for publishing process image data items for receipt by subscribing controller devices, wherein each queue is associated with a particular process image data item.

10. The system of claim 8, wherein the messaging component comprises one or more queues for publishing process image data items for receipt by subscribing controller devices, wherein each queue is associated with a particular type of process image data item.

11. A method for providing access to local process image data to other devices in an industrial production environment, the method comprising:

executing, by a first controller device, a control program configured to provide operating instructions to a production unit over a plurality of scan cycles;

updating, by the first controller device, a process image area during each of the plurality of scan cycles with data associated with the production unit;

storing, by the first controller device, the process image data items into a local non-volatile computer readable medium on the first controller device;

using, by the first controller device, a process image backbone instance to provide one or more second controller devices with access to the stored process image data items, the process image backbone configured as a middleware gluing together runtime environments of the plurality of controller devices, such that the process image areas or historian components of the plurality of controller devices are integrated into a common process image, wherein the process image backbone comprises a plurality of process image backbone instances, each process image backbone instance located on one of the plurality of controller devices, wherein the process image backbone instance located on each controller device includes a data registry comprising one or more objects semantically describing the process image data items stored on the controller device, the data registry providing a list of process image data items available in the controller device, and a messaging component for communicating data from the data registry over the process image backbone, wherein the control program of a first controller device uses the process image backbone to retrieve one or more process image data items from a second controller device and use the retrieved one or more process image data items to generate the operating instructions for the production unit.

12. The method of claim 11, wherein the data registry comprises a data file generated upon startup of the first controller device.

13. The method of claim 11, wherein the data registry comprises a data file dynamically generated in response to a tag browsing request.

14. The method of claim 11, further comprising:

using the process image backbone instance to provide the data registry to each of the second controller devices using a multicast message or a broadcast message.

15. The method of claim 14, wherein the multicast message or the broadcast message is transmitted upon startup of the controller device.

16. The method of claim 11, wherein the process image backbone instance provides access to the stored process image data items using a publish-subscribe messaging pattern to transmit the process image data items to the one or more second controller devices.

17. The system of claim 1, wherein the first controller device is configured to respond to tag browser requests from the second controller device by providing a data registry file or a portion thereof, the first controller device being configured to parse the data registry file and return an appropriate subset of the overall file, if the second controller device only requests a certain portion of the data registry.

18. The method of claim 11, wherein the first controller device re-sponds to tag browser requests from the second controller device by providing a data registry file or a portion thereof, wherein the first controller parses the data registry file and returns an appropriate subset of the overall file, if the second controller device only requests a certain portion of the data registry.

* * * * *